Feb. 12, 1957 D. J. BELCHER ET AL 2,781,453
METHODS AND APPARATUS FOR DETERMINATION OF CHARACTERISTICS
OF MATTER IN A SURFACE LAYER
Filed Feb. 11, 1953 2 Sheets-Sheet 1

Donald J. Belcher
Trevor R. Cuykendall
Henri S. Sack.
INVENTORS
BY Hayward Brown
ATTORNEY Feb. 12, 1957    D. J. BELCHER ET AL    2,781,453
METHODS AND APPARATUS FOR DETERMINATION OF CHARACTERISTICS
OF MATTER IN A SURFACE LAYER
Filed Feb. 11, 1953    2 Sheets-Sheet 2

DONALD J. BELCHER
TREVOR R. CUYKENDALL
HENRI S. SACK
INVENTORS

BY Hayward Brown
ATTORNEY

United States Patent Office 2,781,453
Patented Feb. 12, 1957

2,781,453
METHODS AND APPARATUS FOR DETERMINATION OF CHARACTERISTICS OF MATTER IN A SURFACE LAYER

Donald J. Belcher, Trevor R. Cuykendall, and Henri S. Sack, Ithaca, N. Y., assignors to Cornell University Application February 11, 1953, Serial No. 336,232

6 Claims. (Cl. 250—83.6)

This invention relates to methods and apparatus for the determination of certain characteristics of a surface layer of material, without the need of removing material from this layer, of making a hole into this layer, or otherwise disturbing significantly the layer and, in particular, relates to methods and apparatus for determining the concentration of hydrogenous substance, such as water, in a surface layer and the density of such layer.

The rapid, precise, and easy determination of density and hydrogen content in the top few inches of a material, in particular of natural or artificial soil layers, is of utmost importance in certain fields such as civil engineering and agronomy. In civil engineering, for example, during the building of earth dams, roads, airfields, etc., the density and moisture content is checked regularly during construction. In agronomy the recording of density and moisture in the surface layer is important from the point of view of drainage and root growth. The here-mentioned fields are only a few examples and are not exclusive of other possible applications of the here-proposed methods and apparatus, as for instance checking the curing of concrete, the wetness of paper, the moisture and surface density of materials such as grain in storage bins, concrete mixes, plastic materials, etc.

The conventional method for determining the moisture content of soil, for example, is to remove some of the material and to dry it in an oven and then to determine the loss of weight. Conventional methods for determining the density of a soil, for example, involve the removal and weighing of a portion of the soil, and the measurement of the volume the removed portion had occupied by pouring sand in the hole, or by other means. These methods are slow, the results are not immediately available, and the sample may be influenced by local inhomogenities.

Accordingly, an object of this invention is to provide methods and apparatus for measuring the characteristics of a surface layer which will eliminate the aforementioned difficulties.

Another object of this invention is to provide an improved method and apparatus for measuring surface density.

Another object of this invention is to provide an improved method and apparatus for measuring the content of hydrogenous matter in a surface layer.

Another object of this invention is to provide portable instruments of the type described that can be rolled or carried over the surface and which will give an immediate indication of the desired characteristics of the layer of material underlying the instrument.

Another object of this invention is to provide methods and apparatus of the type described for quickly and accurately measuring density or content of hydrogenous material of a surface layer without removing material from the layer, making a hole in the layer, or otherwise disturbing the layer.

These and other objects and advantages of the invention will be made clear by reference to the following description and accompanying drawings in which.

The method for determining the characteristics of a surface layer of material according to this invention comprises exposing said layer to direct radiation from a radioactive source outside of said layer, and measuring back-scattered radiation from said layer at a position outside of the layer and shielded from the direct radiations from said radioactive source. For determining the surface density the radioactive source used is one capable of emitting gamma radiation and the measuring means includes a detector for the back-scattered gamma rays. For determining the content of hydrogenous material in the layer, the radioactive source is one capable of emitting fast neutrons and the measuring apparatus includes a detector for back-scattered slow neutrons and gamma rays.

The method for density determination is based on the fact that in passing through matter gamma rays are scattered by the electrons of the substance or substances encountered. The equipment consists of an assembly containing principally a gamma ray source, a detector for gamma rays connected to conventional measuring equipment, and a strong gamma ray absorber, such as lead or tungsten placed between the gamma ray source and the detector so as to very greatly reduce the intensity of the gamma ray beam which could reach the detector directly (in a straight line) from the source. When the assembly is placed in contact with some substance, such as soil, gamma rays from the source penetrate the soil mass, interact with the electrons of the material, and are scattered in all directions. The number of rays which are scattered toward the detector and reach it are determined by the measuring equipment. The number so determined is a measure of the density of the surface layer of the substance and for a given assembly a calibration curve can be determined. Such a calibration curve is given in Fig. 3 where the ratio of counting rates is defined as the ratio of the number of gamma rays recorded by the detector when the assembly is in contact with the substance whose density is being determined, to the number recorded when the assembly is in contact with a "standard" containing a well determined and fixed density.

Figure 1:
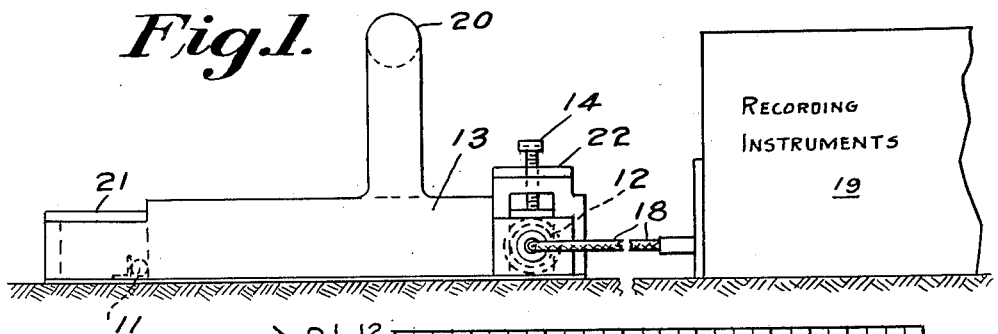
Fig. 1 is a side elevation view of a device for measuring surface density in accordance with the principles of this invention.
Figure 2:
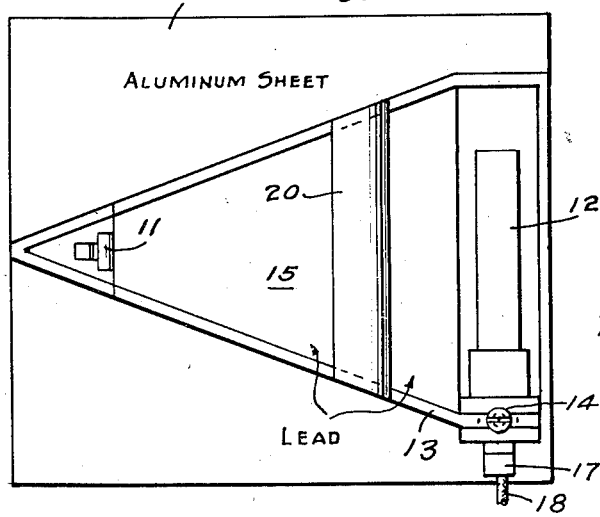
Fig. 2 is a plan view of the device shown in Fig. 1, without the recording instrument attached and with top cover plate removed.

Referring now to Figs. 1 and 2, which illustrate one embodiment of the invention, a gamma ray source is shown at 11. This may be a suitable amount of radium or of cobalt 60 or other gamma ray emitter placed in a small sealed metal capsule. For example, a 1 millicurie cobalt-60 capsule may be used. At 12 is placed a gamma ray detector, in this case a Geiger counter tube, arranged so that its position may be secured in the framework 13. The height of the tube 12 may be adjusted by means of adjusting screw 14. A triangular lead block 15 truncated at its apex, secured within the framework 13, separates the source 11 and detector 12. To the whole assembly is attached a sheet aluminum base plate 16 which makes contact with the surface of the substance whose density is to be measured. A plug-in type connector 17 permits connecting the Geiger counter tube 12 by means of a coaxial cable 18 to suitable counting equipment 19 such as a count-rate meter or scaler, well known to one skilled in the arts. Finally a handle 20 is provided for convenience in carrying the instrument. Cover plates as 21 and 22, Fig. 1, may be provided for the radiation and detector compartments. Other methods of moving the equipment, especially when in contact with the soil surface, such as rollers or skids, may be provided. The recording device, for example, may be carried by a truck, trailer, or the like, and the detecting instrument placed on the ground or the surface.

Instead of the Geiger counter, other types of detectors such as a scintillation crystal and photomultiplier might be mounted perpendicular to the base plate. The shape of the lead block separating the source and detector is shown as triangular merely as an example of one possible shape. The block will, for example, be rectangular in plan, and a further modification consists of two triangular blocks base to base with the gamma ray detector between them and a source at each apex, in an arrangement similar to that shown in Figs. 4 and 5 described hereinafter.

Since it is known that detector and counting equipment may drift over long periods of time, it is advisable to have means of checking and standardizing the equipment. This is done by placing the instrument on the surface of a block of concrete of sufficient size and to take the reading obtained with the instrument on this concrete block as a normalizing reading. Other material than concrete may be used for this purpose, the principal condition being its permanence as regards density and flatness of surface.

Figure 6:
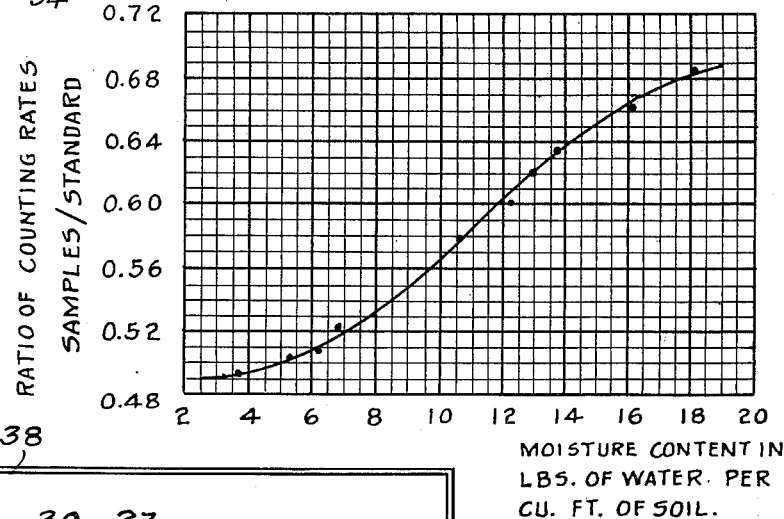
Fig. 6 is a graph showing a typical calibration curve for an instrument of the type shown in Fig. 4.

The method for determining hydrogenous matter is based essentially on the fact that fast neutrons are scattered and slowed down more strongly by hydrogenous substances than by substances containing only heavy atoms. The means for carrying out this embodiment of the invention comprise a fast neutron source and a detector for slow neutrons connected to a conventional nuclear measuring instrument. The number of slow neutrons detected by the detector is a measure of the hydrogen content, and for a given assembly a calibration curve can be determined. Such a calibration curve is given in Fig. 6 where the ratio is given between the number of slow neutrons indicated by the detector divided by the number of slow neutrons by the same instrument when brought in contact with a "standard" containing a well-determined and fixed amount of water or other hydrogen-containing substance.

Figure 3:
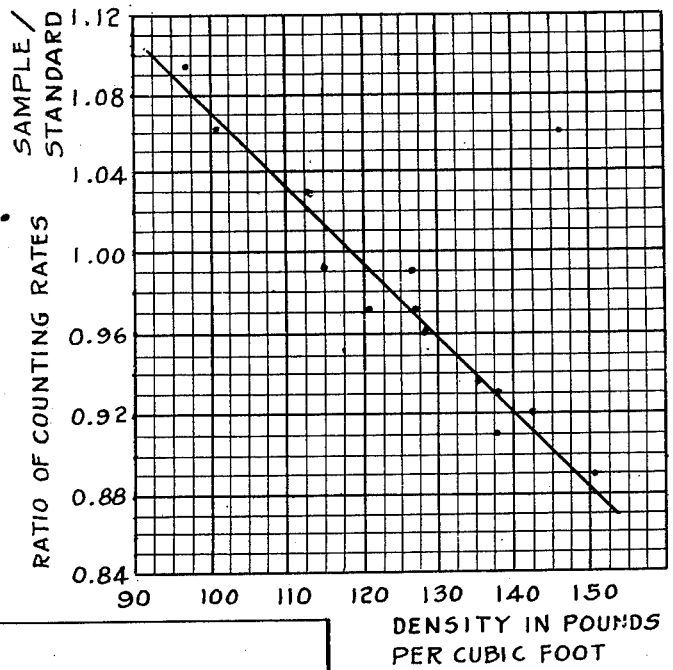
Fig. 3 is a graph showing a typical calibration curve for an instrument of the type shown in Fig. 1.
Figure 4:
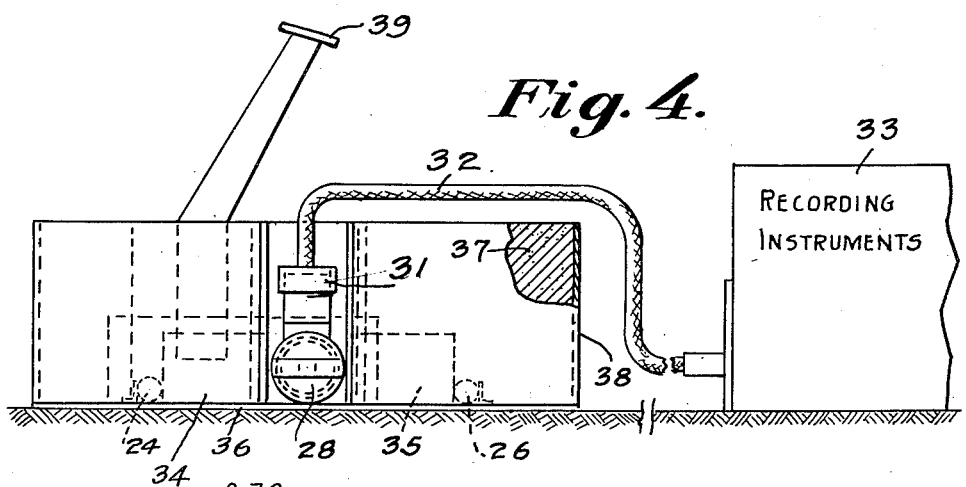
Fig. 4 is a side elevation view of a device for measuring the content of hydrogenous matter in a surface layer.

Referring now to the drawings and to Figs. 3 and 4 in particular, sources giving off fast neutrons, in this particular case a mixture of radium D and beryllium are shown at 24, 25, and 26. Any other fast neutron source may be used, such as polonium-beryllium, radium-beryllium, and the like. Between these sources is placed and rigidly connected to a frame 27 a slow neutron detector. In the model illustrated this detector consists of a commercial thin-wall Geiger Mueller counter tube 28 surrounded by a silver foil 29 which, as is well-known, transforms absorbed slow neutrons into beta rays which are detected by the GM tube. These elements are placed within a tube 30 of brass, or the like. At 31 is shown a plug-in type connector which permits the connecting of the counter tube 28 by means of a coaxial cable 32 to a suitable counting equipment shown diagrammatically at 33, Fig. 4, such as a count-rate meter or a scaler, well-known to one skilled in the arts. This equipment may be carried by a truck, trailer or other conveyance (not shown).

Instead of silver, materials such as rhodium, indium, and others, may be used to convert slow neutrons into beta rays. Instead of the combination of GM tube and metallic foil, other slow neutron detectors may be used such as scintillation counters, boron-filled GM tubes; GM tubes having silver in the inside of the tube, and many other forms.

Figure 5:
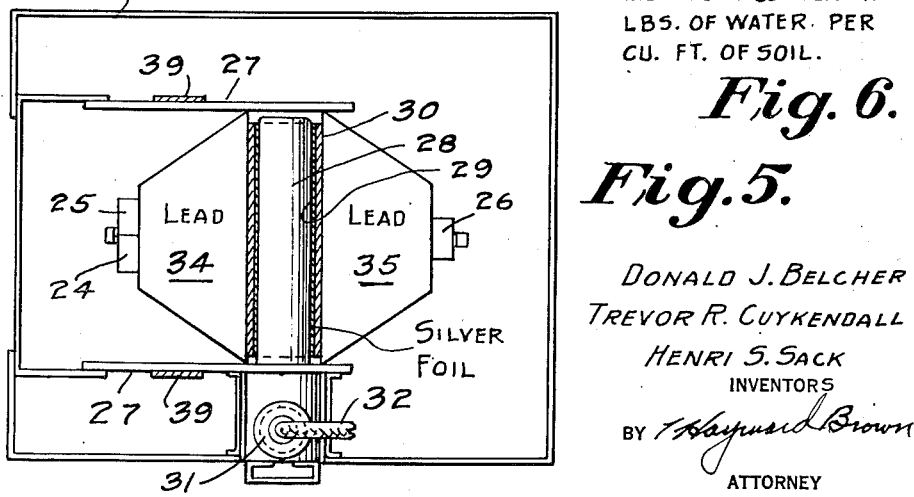
Fig. 5 is a plan view of the device shown in Fig. 4.

Between the neutron sources 24—25 and 26 and the detector 28 are lead blocks 34 and 35 which absorb some of the gamma radiation emitted simultaneously with the neutrons from the sources. The whole assembly is mounted on a flat plate 36, of sheet aluminum or other material which will not block the flow of neutrons appreciably, which makes contact with the surface of the material whose hydrogen content is to be determined. The sources, the counter tube, and the lead are surrounded by paraffin 37 (or some other substance containing hydrogen atoms) within outer frame 38 so as to increase the sensitivity of the instrument. For convenience of illustration Fig. 5 shows the device partially in section and prior to filling it with paraffin. Finally a handle 39 is attached to the frame 27 permitting easy carrying of the apparatus. It is of course possible to mount the apparatus on rollers or other means of easy motion so as to permit rolling the instrument over the surface.

Checking and standardizing this equipment is done by occasionally putting the apparatus on a block of paraffin of sufficient size and to take the reading obtained with the instrument on this paraffin block as a normalizing reading. Other material than paraffin may be used for this purpose, the principal condition being its permanence as regards hydrogenous content and flatness of surface.

Since fast neutrons react with the hydrogen atoms in hydrogen-containing substances in such a way that a certain number of neutrons are captured, and in this process a gamma ray is emitted, the presence of hydrogenous material will not only produce slow neutrons at the place of the detector but also gamma rays, both or each of which then can be used as indicators for the hydrogen content. In the model described above, the detector is such that it measures both neutrons and gamma rays. For certain special applications, it may be desirable by changing the kind of detector or by means of appropriate shields to separate the two agents and to measure slow neutrons and the secondary gamma radiation separately.

While in the foregoing for the sake of an example, the application to the determination of moisture has been discussed, the present method and apparatus can be applied equally well to the determination of concentration of any substance containing hydrogen atoms, such as for instance hydrocarbons, etc.

Obviously a very considerable number of modifications may be made to the apparatus and the general method by anyone skilled in the arts and still come under the scope of the present invention. Some of these possible modifications have been mentioned already. For example, several radiation sources may be arranged along the circumference of a circle, the radiation detector being at the center of the circle. Or this arrangement may be reversed by placing a source at the center of the circle and a curved ionization chamber or other suitable detector along the circumference. The distance between source or sources and the detector may be varied, to give optimum sensitivity for the particular range of densities to be measured. The material which shields the detector from the direct gamma ray beam may be made from material other than lead, depending upon which provides the best shielding for a particular shape and weight.

It is also possible to replace the counting equipment by an automatic recording equipment thus enabling a continuous record of density both in time, and in space by moving simultaneously the apparatus over the surface. The "normalization" of the measurements may be performed in other ways than described above, for example, by bringing a constant radioactive source near the instrument in a well-determined and reproducible position with respect to the detector.

What is claimed is:

1. An apparatus for measuring the characteristics of a surface layer of material comprising a container having a flat bottom adapted to permit intimate contact with the surface of the layer to be measured, a source of radioactivity within said container in close proximity to and adapted to radiate through said container bottom, a detector for radioactivity positioned within said container in close proximity to the bottom thereof, a shield of substantial thickness in said container between said radioactive source and said detector for preventing direct radiation from said source from reaching said detector, and means for connecting the output of said detector to measuring and recording equipment.

2. An apparatus for measuring the density of material contained in a surface layer that comprises a container, the bottom side of which is shaped in such a way as to permit intimate contact with the surface of the layer to be measured, a source of gamma rays positioned in said container in close proximity to the bottom thereof, a detector of gamma rays in said container in close proximity to the bottom thereof and spaced from said source, a shield of substantial thickness between said source and said detector for preventing the direct gamma radiation from reaching said detector, and means of transmitting the output of the detector to recording and measuring equipment.

3. An apparatus for measuring the content in hydrogenous material contained in a surface layer comprising a container, the bottom of which is shaped in such a way as to permit intimate contact with the surface of the layer to be measured, a source of fast neutrons in said container in close proximity to the bottom thereof, a detector for slow neutrons in said container in close proximity to the bottom thereof, and spaced from said source, a shield of appropriate thickness between said neutron source and said detecting instrument for preventing the direct gamma radiation from said source from reaching said detecting means, hydrogenous material surrounding said neutron source, shield, and detecting means on the top and sides thereof, and means for transmitting the output of the detector to separate recording instruments.

4. An apparatus for measuring the content in hydrogenous material contained in a surface layer comprising a container, having a flat bottom to permit intimate contact with the surface of the layer to be measured, a source of fast neutrons in said container in close proximity to the bottom thereof, a detector for gamma rays in said container in close proximity to the bottom thereof and spaced from said source, a shield of substantial thickness between said neutron source and said detecting instrument for preventing the direct gamma radiation from said source from reaching said detecting means, hydrogenous material surrounding said neutron source, shield, and detecting means on the top and sides thereof, and means for transmitting the output of the detector to separate recording instruments.

5. An apparatus for measuring the content in hydrogenous material contained in a surface layer that comprises a container, the bottom of which is shaped in such a way as to permit intimate contact with the surface of the layer to be measured, a source of fast neutrons in said container in close proximity to the bottom thereof, a detector for the simultaneous counting of gamma rays and slow neutrons in said container spaced from said source and adjacent to the bottom thereof, a shield of appropriate thickness between said neutron source and said detecting instrument for preventing the direct gamma radiating from said source from reaching said detecting means, hydrogenous material surrounding said neutron source, shield, and detecting means on the top and sides thereof, and means for transmitting the output of the detector to separate recording instruments.

6. An apparatus for measuring the content of hydrogenous material contained in a surface layer that comprises a container, having a flat bottom to permit intimate contact with the surface of the layer to be measured, a source of fast neutrons adjacent opposite ends of said container and in close proximity to the bottom thereof, a detector for slow neutrons positioned between said radiation sources and spaced therefrom, a lead shield of substantial thickness separating said radiation sources from said detector, hydrogenous material surrounding said shield, said neutron source, and detecting means on the top and sides thereof, and means of transmitting the output of the detector to a recording instrument placed separately from the container.

References Cited in the file of this patent

UNITED STATES PATENTS

| | | |
|---|---|---|
| 2,220,509 | Brons | Nov. 5, 1940 |
| 2,508,772 | Pontecorvo | May 23, 1950 |
| 2,535,066 | Herzog | Dec. 26, 1950 |
| 2,562,914 | Herzog | Aug. 7, 1951 |